US006251274B1

(12) United States Patent
Shepherd

(10) Patent No.: US 6,251,274 B1
(45) Date of Patent: Jun. 26, 2001

(54) FAUCET ATTACHMENT FOR TREATING WATER

(75) Inventor: Charles G. Shepherd, deceased, late of Oakville (CA), by Marjorie E. Shepherd, executrix

(73) Assignee: Envirogard Products Limited, Richmond Hill (CA)

( * ) Notice: Subject to any disclaimer, the term of this patent is extended or adjusted under 35 U.S.C. 154(b) by 0 days.

(21) Appl. No.: 09/268,310

(22) Filed: Mar. 16, 1999

(51) Int. Cl.[7] .................................................. B01D 35/02
(52) U.S. Cl. .......................... 210/235; 210/420; 210/456; 210/460
(58) Field of Search .......................... 210/449, DIG. 17, 210/460, 420, 424, 419, 235, 456, 282, 232

(56) References Cited

U.S. PATENT DOCUMENTS

| 3,789,991 | 2/1974 | Krongos | 210/213 |
|---|---|---|---|
| 3,822,018 | 7/1974 | Krongos | 210/232 |
| 3,853,761 | 12/1974 | McClory | 210/100 |
| 4,147,631 | 4/1979 | Deines et al. | 210/137 |
| 4,172,796 | 10/1979 | Corder | 210/238 |
| 4,212,743 | 7/1980 | Van Meter et al. | 210/282 |
| 4,431,533 | 2/1984 | Wrede | 210/87 |
| 4,504,389 * | 3/1985 | Rundzaitis | 210/266 |
| 4,591,438 | 5/1986 | Tanabe et al. | 210/282 |
| 4,680,116 | 7/1987 | Kamiwada et al. | 210/282 |
| 4,686,037 | 8/1987 | Lang | 210/221.2 |
| 4,732,674 | 3/1988 | Tumura et al. | 210/266 |
| 4,770,768 | 9/1988 | Lang | 210/94 |
| 5,017,286 | 5/1991 | Heiligman | 210/266 |
| 5,151,179 * | 9/1992 | Bach et al. | 210/250 |
| 5,192,436 | 3/1993 | Sasaki etal. | 210/264 |
| 5,256,287 * | 10/1993 | Underwood | 210/282 |
| 5,527,451 | 6/1996 | Hembree et al. | 210/88 |
| 5,653,868 * | 8/1997 | Yanou et al. | 210/232 |
| 5,833,849 * | 11/1998 | Primdahl | 210/460 |
| 5,935,426 * | 8/1999 | Giodano et al. | 210/449 |

FOREIGN PATENT DOCUMENTS 9-314133 * 12/1997 (JP) .

* cited by examiner

Primary Examiner—David A. Simmons
Assistant Examiner—Frank M. Lawrence
(74) Attorney, Agent, or Firm—Christopher R. Scott

(57) ABSTRACT

The invention provides a faucet attachment for treating water issuing from a faucet of the type having a threaded outlet for receiving an aerator. The attachment has a valve assembly including a generally cylindrical inner structure having a faucet attachment for threadably engaging the thread on the faucet to seal the faucet attachment to the faucet, and a valve element below the faucet attachment. An outer structure contains the inner structure and includes a first outlet below the valve element, and a second outlet extending orthogonally with respect to said main axis. A housing receives water from the second outlet and a bottom exit is provided on the housing for dispensing treated water. The housing is movable angularly between a first position in which water leaves through the bottom exit. A cartridge is also provided for use in the attachment.

15 Claims, 2 Drawing Sheets

FAUCET ATTACHMENT FOR TREATING WATER

FIELD OF THE INVENTION

This invention relates to water treatment devices suitable for attachment to a domestic water faucet having a threaded end for normally receiving an aerator, and more particularly to a cartridge for use in such a device.

BACKGROUND OF THE INVENTION

It has become common practice to treat tap water to further purify the water. Devices have been developed which are placed in the water line to treat the water before it reaches a faucet and other devices simply collect water from the faucet in a jug. A replacement cartridge is included in the jug so that the water passes through the cartridge before collection in the jug. A third approach has been to provide a water treatment device which can be attached directly to the faucet and which operates selectively to either allow water to pass directly from the faucet without treatment, or to pass through a water treatment cartridge before exiting from the structure. The present invention is of the type which attaches to the faucet.

Examples of devices which attach to faucets are to be found in U.S. Pat. No. 5,527,451 to Hembree, et al and U.S. Pat. No. 5,653,868 to Yanou, et al. The general arrangement of the devices shown in these patents minimises loss of space under the faucet and permits selection of flow either without treatment or through water treatment material. In both patents, there is a side-by-side arrangement of valve assembly and a housing for the water treatment material. In the case of the patent to Hanou, et al, the housing is rotated relative to a main axis through the valve assembly to change from a straight flow through structure to a structure in which the water is diverted to flow through the water treatment material. This has become a general arrangement in structures of this kind. However, there are drawbacks.

It will be apparent that when assembling structures to conventional water faucets, there will be a variety of positions needed due to the variation in faucets and also due to their location in relation to sinks and surrounding structures. It is therefore necessary to be able to assemble the structure on the faucet so that the movement necessary to operate it is always unimpaired by surrounding structures. Also, users may prefer to have the arrangement such that the housing containing the filter material is to the left of the faucet whereas others may prefer it to the right of the faucet. Consequently, it is necessary to provide an attachment to the faucet which resists accidental movement in the wrong direction and also provides a strong positive connection.

A typical connection is shown in the Yanou, et al patent in which the structure is brought to bear against the faucet and clamped using a simple friction arrangement. The clamp is such that a tool must be applied externally and any force applied may result in damage to the structure and an unsightly result. Further, a large force is necessary to ensure positive connection so that when the user moves the housing to operate the device, the device will not rotate on the end of the faucet.

It is therefore desirable to provide a water treatment device which does not suffer from these disadvantages and which has a more positive connection resulting in a more positive "feel" when the structure is being operated by a user.

Another disadvantage of the prior art structure is that, once the water has been treated, it comes into contact with surrounding structures. This is undesirable and it is also an object of the present invention to provide a cartridge for use in a water treatment device such that treated water will leave the cartridge directly.

SUMMARY OF THE INVENTION

In one of its aspects, the invention provides for treating water issuing from a faucet of the type having a threaded outlet for receiving an aerator. The faucet attachment has a valve assembly including a generally cylindrical inner structure disposed about a main axis, and an outer structure rotatably mounted about the inner structure for limited angular motion about the main axis between a first position and a second position. The inner structure has a faucet attachment for threadably engaging the thread on the faucet to seal the faucet attachment to the faucet, and a valve element below the faucet attachment. The outer structure has a main body and an attachment ring cooperating with the main body to contain the inner structure and includes a first outlet below the valve element, and a second outlet extending orthogonally with respect to said main axis. A generally cylindrical housing is disposed about a central axis lying in parallel with the main axis, and the housing is attached to the valve assembly. An inlet in the housing receives water from the second outlet and a bottom exit is provided on the housing dispensing treated water. The housing is movable angularly with respect to the main axis between a first position in which water leaves through a first outlet and a second position in which water passes through the second outlet, through the housing and leaves through the bottom exit. The faucet attachment is first assembled on the faucet by tightening the faucet attachment on the faucet, and then the valve element is positioned and located angularly in the faucet attachment before completing the assembly.

In another of its aspects, the invention provides a cartridge for use in a faucet attachment.

These and other aspects of the invention will be better understood with reference to the following description and drawings.

Figure 1:
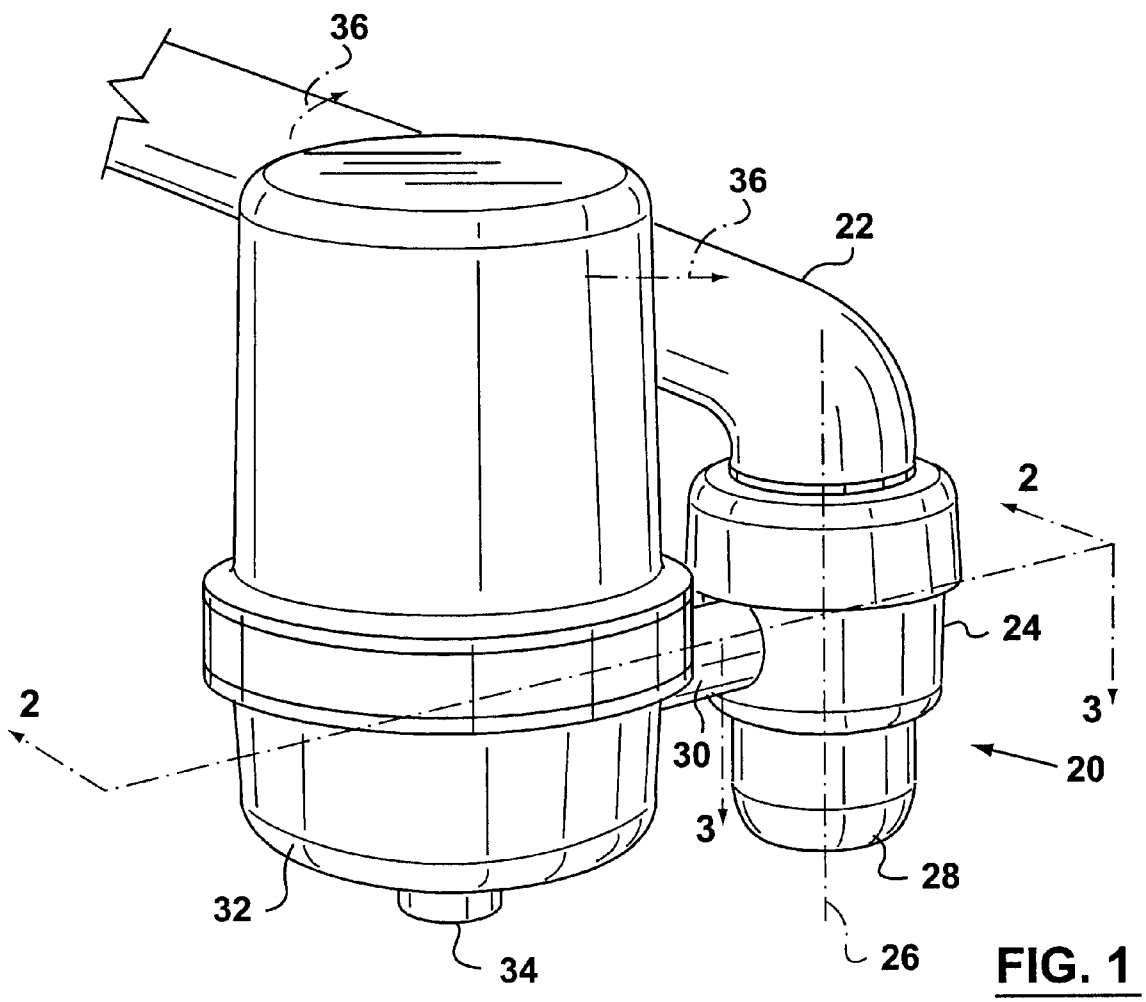
FIG. 1 is an isometric view of a faucet attachment according to the invention and shown attached to a standard domestic faucet having a threaded end, the attachment being movable between a first position to permit flow directly from the faucet, and a second position in which the flow is diverted through a water treatment cartridge.

Reference is first made to FIG. 1 which shows a preferred embodiment of a faucet attachment according to the invention and designated generally by the numeral 20. The attachment is assembled on the end of an exemplary faucet 22 so that water emanating from the faucet will enter a valve assembly 24, and depending upon the position of the attachment about a main axis 26, water will either leave via a first outlet 28 on the bottom of the valve assembly 24 or pass through a connector 30 and, after treatment in a housing 32, leave through an exit 34. The user decides whether or not the water is to be treated and then selects which path the water will follow by moving the housing angularly about axis 26 as indicated by arrows 36.

The structure of the attachment 20 will be described with reference to assembly of the structure on the faucet 22.

Figure 2:
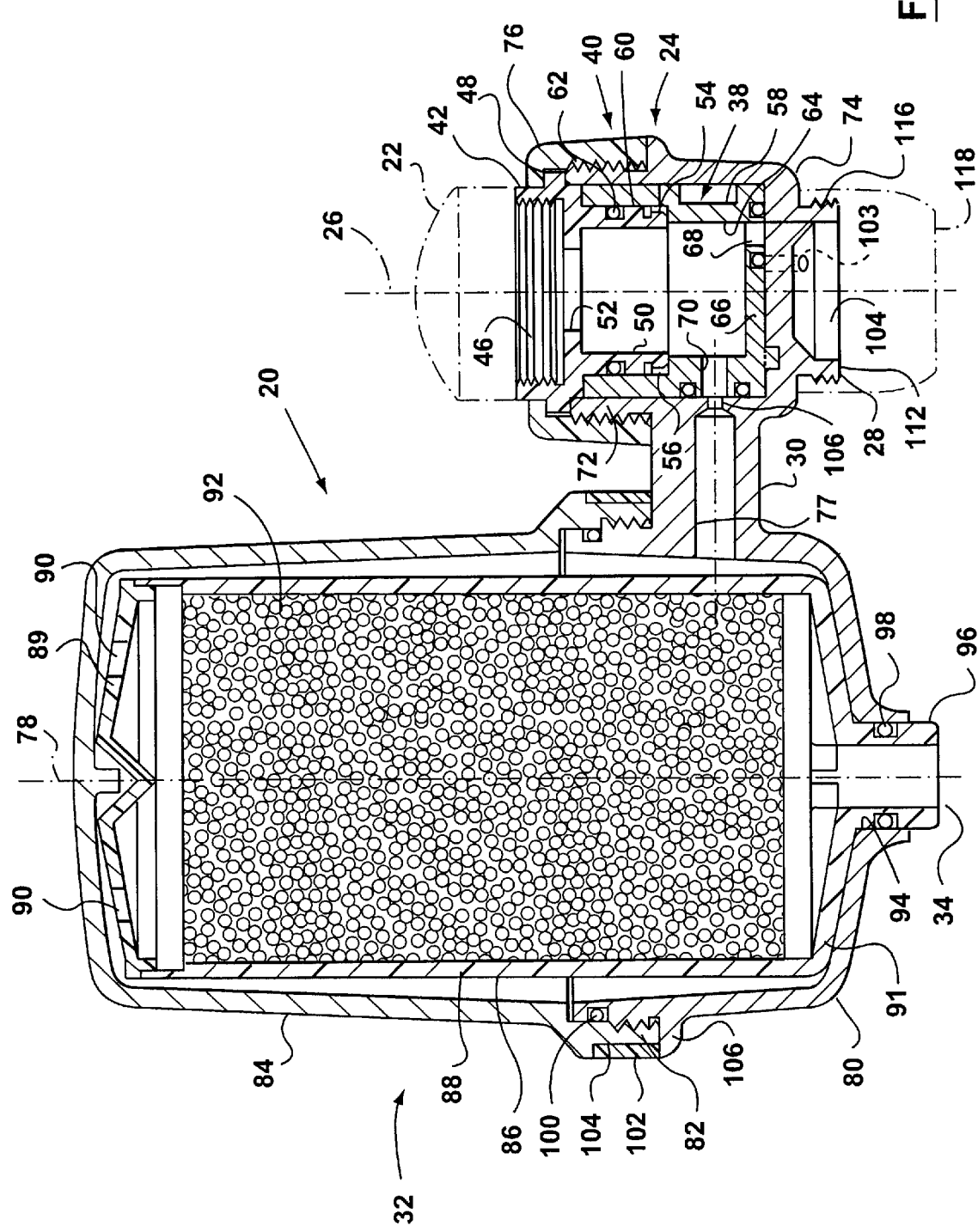
FIG. 2 is a sectional view on line 2—2 of FIG. 1 with the attachment in the second position.

Reference is next made to FIG. 2 in which it will be seen that the faucet attachment 20 is shown in section with the faucet 22 indicated in ghost outline. The valve assembly 24 consists essentially of an inner structure indicated generally by the numeral 38 and an outer structure indicated generally by the numeral 40. The inner structure includes a faucet connector 42 which is assembled on the faucet 22 as a first step in coupling the attachment 20 to the faucet. The faucet connector 42 is generally cylindrical and extends about the main axis 26 and defines a threaded recess 46 which has an internal thread matching the standard male thread on the faucet 22. An annular collar 48 is provided for engagement with the outer structure 40 as will be described, and a tubular cylindrical portion 50 extends downwardly and is connected to the internal threaded recess 46 by an opening 52. At the lower end of the connector 42, there is an external ring of small, equally-spaced teeth 54 engaged in recesses between suitably spaced inwardly facing teeth 56 formed in a valve element 58 as will be described. This permits the valve element 58 to be positioned angularly relative to the connector 42 in any one of a number of positions, the number being equal to the number of teeth on each part.

The initial assembly consists of taking the faucet connector 42 and threading it onto the faucet 22 using a suitable washer if necessary. The connector 42 is tightened on the faucet by gripping the teeth 54. A suitable ring wrench, made for the purpose, can be slipped over the teeth 54 and used as a lever to rotate the faucet connector into tight engagement with the faucet. Once this is done, the connector 42 becomes part of the faucet 22 and remains in position regardless of adjustment of the structure as will be explained. If the connector is marked while it is being assembled, the marks will be hidden once assembly is completed.

Turning now to the valve element 58, this part is positioned below the connector 42 and is located angularly on the faucet connector 42 by inter-engagement of the teeth 50 and 56. The teeth 56 are formed at the bottom of a cylindrical recess 60 shaped to accommodate the cylindrical portion 50 of the connector 42 and sealed using a suitable O-ring 62. The angular position of the valve element 58 can be selected by simply rotating it before it engages with the faucet connector 42 and then moving it vertically along axis 44 to bring it into engagement with the connector 42. This then sets the position in which the resulting assembly will relate to the faucet 22 as will be described.

The valve element 58 has a second smaller cylindrical recess 64 extending downwardly from the recess 60 and terminating at a bottom wall 66. A first opening 68 provides passage through the bottom wall 66 and a second opening 70 is formed in a side wall 72 which defines the cylindrical recesses 60 and 64. Because the valve element 58 is located angularly with respect to the faucet connector 42, the first and second openings 68, 70 are fixed in relation to the faucet, whereas the outer structure 40 can be rotated within limits about the axis 26.

As also seen in FIG. 2, the outer structure 40 includes a cup-shaped main body 74 defining a recess containing the inner structure 38. An attachment ring 76 is captive above the faucet connector 42 by engagement with the collar 48 on the connector 42 and defines an internal thread which complements an external thread on the main body 74. As a result, engagement of the ring 76 and the body 74 will result in containing the inner structure within the outer structure with the outer structure free to move angularly within limits.

This limited movement will be explained more fully later but, for the moment, it is sufficient to understand that this angular movement dictates whether or not water from the faucet 22 will exit from the valve assembly 24 directly downwards out of the first outlet 28 or through the housing 32 where it will be treated and leave through the bottom exit 34.

Continuing for the moment with the structure, the main body 74 is connected to the housing 32 by the integral connector 30 which defines a passage 77 to carry water from the valve assembly 24 to the housing 32. The housing is arranged about a central axis 78 which is parallel to the main axis 26 and includes a support 80 integrally attached to the connector 30 and extending upwardly from the bottom exit 34 to terminate at a threaded connection 82 where the support meets a cover 84. The housing is positioned to contain a suitable cartridge 86 which has a tubular, cylindrical outer wall 88, a top 89 having top openings 90, and a bottom 91 in engagement with the support 80. This engagement is enhanced by the flexible top which is deflected slightly on assembly to create a small compressive load on the support 80. The wall 88 is spaced from the inside of the housing 32 so that water entering through the passage 77 will move upwardly about the cartridge and then pass through top openings 90 before moving downwardly through cartridge material 92 before finding its way to the exit 34. This exit is made up of the support 80 defining a opening 94 for containing a neck 96 integrally formed with the bottom 91 of the cartridge 86 and having an O-ring seal 98. This means that water leaving the cartridge 90 passes directly out of the cartridge and can not come into contact with the housing thereby minimizing the risk of contaminant buildup on the housing affecting the treated water.

The threaded connection 82 is supplemented by an O-ring 100 and a date ring 102 is frictionally engaged in a suitable recess 104 in the cover 84 and held in place by an annular shoulder 106 on the support. The ring 102 can be rotated against friction to a position to use markings on the ring and a base mark on the housing to indicate the date when a new cartridge was put in place. Once in position, the ring 102 is left in place as a reminder of the age of the cartridge.

The bottom wall 66 of the inner structure 38 can be seen defining the first opening 68 which is to communicate with a duct 103 in the main body 74 which leads to a downwardly-opening recess 104 which is part of the first outlet 28. Also, in section, the second opening 70 is seen leading to a passage 77 in the connector 30.

Figure 3:
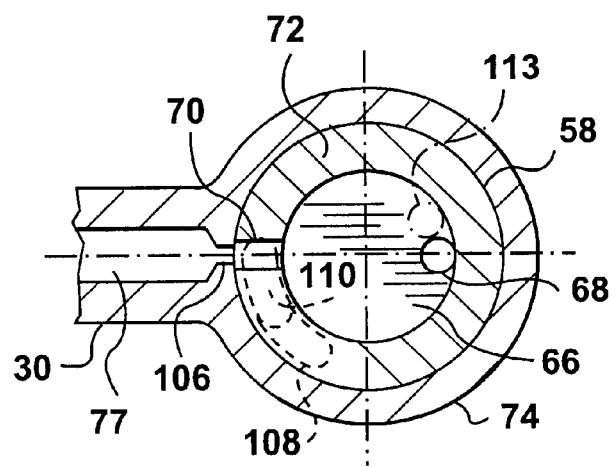
FIG. 3 is a partial sectional view on line 3—3 of FIG. 1 and illustrating internal parts of the attachment with the attachment also in the second position.

As seen in FIG. 3, the main body 74 defines an annular slot 108 containing a shorter but similarly shaped downwardly-extending peg 110 which forms part of the valve element 58. The peg 110 is shown at one extremity of the slot 108 and in this position the second opening 70 in the valve element 58 is in alignment with the second outlet 106, and this is the second position mentioned earlier in which flow will pass through the cartridge material 92 (FIG. 2) and leave through the bottom exit 34 of the housing 32. When the user rotates the housing 32, along with the connector 30 and outer structure 40 (FIG. 2) in an anti-clockwise direction (with reference to FIG. 3), the result will be that the peg 110 moves to the other extremity of the slot 108 where no further motion can take place. The first opening 68 then comes into alignment with duct 103 (FIG. 2) in the main body 74 and this leads to the downwardly-opening recess 104 so that the water exits through the first outlet 28 of the faucet attachment. As seen in FIG. 2, the recess 104 is formed in a tabular projection 112 which has an external thread 116 to receive an aerator 118 shown in ghost outline.

A preferred embodiment has been described to demonstrate the best mode of making a faucet attachment according to the invention. Other embodiments can be made in accordance with the teachings of this description, and such embodiments are within the scope of the claims attached to this description.

What is claimed is:

1. A faucet attachment for treating water issuing from a faucet having a threaded outlet for receiving an aerator, the faucet attachment including:

a valve assembly having a generally cylindrical inner structure disposed about a main axis, and an outer structure rotatably mounted about the inner structure for limited angular motion relative to the inner structure about the main axis between a first position and a second position, the outer structure being removable from the inner structure to expose the inner structure;

the inner structure including a faucet attachment for threadably engaging said thread on the faucet with the outer structure removed for sealing the faucet attachment to the faucet, and a valve element below the faucet attachment, the faucet attachment and the valve element including an angular locator to selectively locate the valve element about said axis relative to the faucet attachment so that the valve element can be positioned relative to the faucet before the outer structure is added to the inner structure;

the outer structure including a main body and an attachment ring cooperating with the main body for assembly about the inner structure and having a first outlet below the valve element and a second outlet extending orthogonally with respect to said main axis, the first and second outlets being arranged to cooperate with the valve element so that, in said first position, water from the faucet will flow through the valve element and issue from the first outlet, and in the second position water will flow through the valve element and issue from the second outlet; and a housing for a water treatment cartridge, the housing being attached to the outer structure, and having an inlet to receive water from the second outlet and a bottom exit for dispensing treated water, whereby the faucet attachment can be assembled on the faucet by first tightening the faucet attachment on the faucet, positioning the valve element angularly on the faucet attachment as required, and then completing the assembly so that water from the faucet can be caused to leave by the first outlet on the valve assembly or by the exit on the housing by moving the housing and outer structure angularly about the main axis between the respective said first and second positions.

2. A faucet attachment as claimed in claim 1 in which the housing includes a support attached to the main body and defining said exit, and a cover above the support and releasably attached to the support to permit removal and replacement of the cartridge.

3. A faucet attachment as claimed in claim 2 and further including a connector between the main body of the outer structure and the support, the connector defining a passage connecting said second outlet to said inlet.

4. A faucet attachment as claimed in claim 3 in which the main body of the outer structure, connector, and the support are integrally formed.

5. A faucet attachment as claimed in claim 1 in which the housing is generally cylindrical and disposed about a central axis which is substantially parallel to said main axis.

6. A faucet attachment as claimed in claim 1 in which the main body includes a threaded collar to receive an aerator, the threaded outlet extending downwardly and containing said first outlet.

7. A faucet attachment as claimed in claim 2 in which the housing is generally cylindrical and disposed about a central axis which is substantially parallel to said main axis.

8. A faucet attachment as claimed in claim 7 in which the main body includes a threaded collar to receive an aerator, the threaded outlet extending downwardly and containing said first outlet.

9. A faucet attachment as claimed in claim 1 and further including a cartridge of material for treating the water, the cartridge being generally cylindrical and having a top entrance and a bottom opening through which the water leaves, the bottom opening being defined by a downwardly-extending neck, and in which the bottom exit of the support contains the neck so that water will leave the cartridge without contacting the housing.

10. A faucet attachment as claimed in claim 9 in which the housing includes a support attached to the main body and defining said exit, and a cover above the support and releasably attached to the support to permit removal and replacement of the cartridge.

11. A faucet attachment as claimed in claim 9 and further including a connector between the main body of the outer structure and the support, the connector defining a passage connecting said second outlet to said inlet.

12. A faucet attachment as claimed in claim 11 in which the main body of the outer structure, connector, and the support are integrally formed.

13. A faucet attachment as claimed in claim 9 in which the housing is generally cylindrical and disposed about a central axis which is substantially parallel to said main axis.

14. A faucet attachment as claimed in claim 9 in which the main body includes a threaded collar to receive an aerator, the threaded outlet extending downwardly and containing said first outlet.

15. A faucet attachment as claimed in claim 7 and further including a date ring frictionally engaged about the cover and retained on the cover by the engagement of the cover with the support.

* * * * *